(12) United States Patent
Watanabe

(10) Patent No.: US 9,863,012 B2
(45) Date of Patent: Jan. 9, 2018

(54) LEATHER COATING COMPOSITION AND LEATHER COATED THEREWITH

(71) Applicant: Nissin Chemical Industry Co., Ltd., Echizen-shi, Fukui-ken (JP)

(72) Inventor: Kentaro Watanabe, Echizen (JP)

(73) Assignee: NISSIN CHEMICAL INDUSTRY CO., LTD., Echizen-Shi (JP)

( * ) Notice: Subject to any disclaimer, the term of this patent is extended or adjusted under 35 U.S.C. 154(b) by 101 days.

(21) Appl. No.: 14/977,275

(22) Filed: Dec. 21, 2015

(65) Prior Publication Data

US 2016/0177408 A1 Jun. 23, 2016

(30) Foreign Application Priority Data

Dec. 22, 2014 (JP) ................. 2014-258179

(51) Int. Cl.
| | |
|---|---|
| *C14C 11/00* | (2006.01) |
| *C09D 175/04* | (2006.01) |
| *C09D 7/12* | (2006.01) |
| *C09D 5/00* | (2006.01) |
| *C08F 283/12* | (2006.01) |

(52) U.S. Cl.
CPC ........ *C14C 11/006* (2013.01); *C08F 283/124* (2013.01); *C09D 5/00* (2013.01); *C09D 7/1216* (2013.01)

(58) Field of Classification Search
CPC ....... C08L 51/085; C09D 175/04; C09D 5/00; C09D 7/1216; C08F 283/124; C14C 11/006

USPC .......................................................... 525/63
See application file for complete search history.

(56) References Cited

U.S. PATENT DOCUMENTS

| | | | | | |
|---|---|---|---|---|---|
| 4,571,417 | A | * | 2/1986 | Thoma ................ | C08G 18/10 428/447 |
| 5,476,912 | A | * | 12/1995 | Hosoi ................. | A61K 6/0026 526/279 |
| 5,576,096 | A | * | 11/1996 | Ono .................... | C08F 290/068 264/DIG. 80 |
| 2006/0058436 | A1 | * | 3/2006 | Kasler ................. | C09D 175/04 524/261 |
| 2010/0310882 | A1 | * | 12/2010 | Ogawa ................ | C09D 175/04 428/423.4 |

FOREIGN PATENT DOCUMENTS

| | | | |
|---|---|---|---|
| JP | 2007-138326 | A | 6/2007 |
| JP | 2007-314919 | A | 12/2007 |
| JP | 2008-308785 | A | 12/2008 |
| JP | 2010-241963 | A | 10/2010 |

* cited by examiner

*Primary Examiner* — Thao T Tran
(74) *Attorney, Agent, or Firm* — Birch, Stewart, Kolasch & Birch, LLP

(57) ABSTRACT

A leather coating composition comprising (I) an aqueous urethane resin, (II) a matting agent, and (III) a silicone-acrylic graft copolymer resin emulsion obtained by reacting a polyorganosiloxane with a (meth)acrylate monomer has improved abrasion resistance and anti-staining properties. Leather coated with the composition is given an aesthetic appearance and abrasion resistance.

10 Claims, No Drawings

LEATHER COATING COMPOSITION AND LEATHER COATED THEREWITH

CROSS-REFERENCE TO RELATED APPLICATION

This non-provisional application claims priority under 35 U.S.C. §119(a) on Patent Application No. 2014-258179 filed in Japan on Dec. 22, 2014, the entire contents of which are hereby incorporated by reference.

TECHNICAL FIELD

This invention relates to a leather coating composition having abrasion resistance and anti-staining properties and a leather coated therewith.

BACKGROUND ART

From the past, whether natural or synthetic, leathers are widely used in many applications including car seats, furniture, clothing, shoes, bags, sanitary products, and outdoor tents. For use in these applications, leather must have abrasion resistance and slippage while a satisfactory countermeasure against staining must also be taken therefor. Most of prior art resin compositions for use with leather are of solvent type, i.e., using organic solvents for improving film-forming properties. In consideration of their impacts to the human body and environment, efforts are made to develop aqueous resin compositions.

One known method for improving the abrasion resistance and slippage of leather is to incorporate a silicone component such as silicone oil or silicone powder in a resin composition from which leather is prepared. For example, Patent Document 1 discloses the preparation of a synthetic leather including an elastomer layer having acrylic-silicone copolymer particles kneaded in a urethane elastomer. Although abrasion resistance is improved, kneading of particles in resin complicates the overall process. The amount of acrylic-silicone copolymer particles loaded must be increased to acquire a certain level of abrasion resistance.

This problem may be solved by coating the surface of natural or synthetic leather with resins or the like. Patent Document 2 discloses a surface finish composition comprising an aqueous polyurethane resin, a crosslinker and a polyether-modified silicone, with which synthetic leather is coated for improving abrasion resistance. However, since this surface finish composition is highly hydrophilic, the lack of anti-staining at the leather surface becomes a concern. For example, when deep colored beverage or liquid such as coffee deposits on the leather, the liquid color is transferred to the leather. When the leather is rubbed with clothing, the color of fibers is transferred to the leather.

It is also known that the anti-staining property of leather is improved by coating the leather surface with resins or the like. Patent Document 3 discloses that natural leather is coated with a topcoat composition comprising an acrylic resin, an acrylic-silica resin, an acrylic-polysiloxane resin, a silicone base touch-improver and other components. Patent Document 4 describes synthetic leather made of urethane resin which is surface coated with a silicone resin coating. These coatings are still unsatisfactory as the aqueous-based coating meeting both abrasion resistance and anti-staining properties, leaving room for improvement.

CITATION LIST

Patent Document 1: JP-A 2007-138326
Patent Document 2: JP-A 2007-314919
Patent Document 3: JP-A 2010-241963
Patent Document 4: JP-A 2008-308785

DISCLOSURE OF INVENTION

An object of the invention is to provide a leather coating composition comprising an aqueous urethane resin, a matting agent, and a silicone-acrylic graft copolymer resin emulsion and having abrasion resistance and anti-staining properties, and a leather coated therewith.

The inventor has found that when a coating agent comprising an aqueous urethane resin and a matting agent is blended with a silicone-acrylic graft copolymer resin emulsion, an effective leather coating composition is obtained, and that when leather is surface coated with the coating composition, the coating imparts abrasion resistance and anti-staining properties to the leather.

In one aspect, the present invention provides a leather coating composition comprising, all calculated as solid contents, (I) 50 to 80% by weight of an aqueous urethane resin,
(II) 10 to 40% by weight of a matting agent, and
(III) 1 to 30% by weight of a silicone-acrylic graft copolymer resin emulsion obtained by reacting a polyorganosiloxane with an acrylate or methacrylate monomer in a weight ratio of 80:20 to 99:1. The polyorganosiloxane has a molecular weight of at least 300,000 and is represented by the general formula (1):

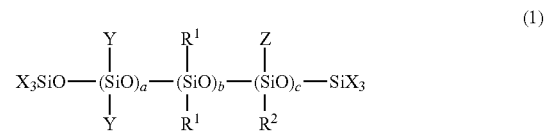

wherein $R^1$ is each independently a substituted or unsubstituted monovalent hydrocarbon group of 1 to 20 carbon atoms such as straight, branched or cyclic $C_1$-$C_{20}$ alkyl group or $C_6$-$C_{20}$ aryl group, $R^2$ is a mercapto, acryloxy or methacryloxy-substituted $C_1$-$C_5$ alkyl group, or vinyl group, X is each independently a substituted or unsubstituted monovalent hydrocarbon group of 1 to 20 carbon atoms (such as straight, branched or cyclic $C_1$-$C_{20}$ alkyl group or $C_6$-$C_{20}$ aryl group), $C_1$-$C_{20}$ alkoxy group, or hydroxyl group, Y is each independently X or —[O—Si(X)$_2$]$_4$—X, at least two of X and Y being hydroxyl groups, Z is a $C_1$-$C_4$ alkyl group, $C_1$-$C_4$ alkoxy group or hydroxyl group, a is a number of 0 to 1,000, b is a positive number of 100 to 10,000, c is a positive number of 1 to 10, and d is a positive number of 1 to 1,000.

In a preferred embodiment, the silicone-acrylic graft copolymer resin emulsion (III) is an emulsion graft copolymer of a mixture of (i) the polyorganosiloxane having formula (1), (ii) the acrylate or methacrylate monomer, and (iii) a functionalized monomer copolymerizable therewith.

In a preferred embodiment, the aqueous urethane resin (I) has a weight average molecular weight of 20,000 to 400,000 and preferably is a polycarbonate type urethane resin.

In a preferred embodiment, the matting agent (II) is silica, silicone powder, acrylic powder or urethane powder.

In a preferred embodiment, the silicone-acrylic graft copolymer resin emulsion (III) has a solid content of 1 to 30% by weight and a viscosity of up to 500 mPa·s at 25° C.

Also contemplated herein is a leather coated with the coating composition.

Advantageous Effects of Invention

The leather coating composition has improved abrasion resistance and anti-staining properties. Leather coated with the composition is given an aesthetic appearance and high abrasion resistance. Because of the aqueous base, great advantages are expected from the working and environmental aspects.

DESCRIPTION OF PREFERRED EMBODIMENTS

As used herein, the notation (Cn-Cm) means a group containing from n to m carbon atoms per group. Also, the terminology "(meth)acrylic" is intended to mean "acrylic or methacrylic", "(meth)acryloxy" is intended to mean "acryloxy" or "methacryloxy", and so on.

Briefly stated, the invention relates to a leather coating composition comprising (I) an aqueous urethane resin, (II) a matting agent, and (III) a silicone-acrylic graft copolymer resin emulsion; and a leather having a coating of the coating composition formed thereon.

Component (I) is an aqueous urethane resin which may be any of water-soluble urethane resins obtained from the reaction of a polyisocyanate with a polyol, the polyol being selected from polyether, polycarbonate, and polyester polyols. Preferably the aqueous urethane resin has a viscosity of 10 to 500 mPa·s at 25° C.

Suitable polyether type urethane resins include those commercially available as Adeka Bontighter HUX-350 from Adeka Corp., WLS-201 and WLS-202 from DIC Corp., SuperFlex E-4000 and E-4800 from DKS Co., Ltd. Suitable polycarbonate type urethane resins include those commercially available as Hydran WLS-210 and WLS-213 from DIC Corp., UW-1005E and UW-5502 from Ube Industries, Ltd., Permarin UA-368 from Sanyo Chemical Industries, Ltd., SuperFlex 460 and SuperFlex 470 from DKS Co., Ltd. Suitable polyester type urethane resins include those commercially available as Adeka Bontighter HUX-380 and HUX-540 from Adeka Corp., SuperFlex 420 and SuperFlex 860 from DKS Co., Ltd.

The urethane resin preferably has a weight average molecular weight (Mw) of 20,000 to 400,000, more preferably 30,000 to 200,000. The weight average molecular weight is measured as follows. A predetermined amount of a urethane resin was dissolved in a predetermined amount of tetrahydrofuran. The solution was filtered to obtain a test sample. Retention time and intensity of the test sample are measured by using a gel permeation chromatograph equipped with a differential refractive index detector. A calibration curve is drawn up from polystyrenes having various known molecular weights (GL Sciences Inc.) and the weight average molecular weight of the urethane resin is calculated by automatic calculation.

Inter alia, polycarbonate type urethane resins are preferred.

An appropriate amount of the aqueous urethane resin used is 50 to 80% by weight, preferably 60 to 80% by weight based on the coating composition, both calculated as solid contents. If the amount of the aqueous urethane resin is less than 50 wt %, a coating may have considerably poor abrasion resistance and other properties. If the amount of the aqueous urethane resin exceeds 80 wt %, the coating may have an unsmooth surface which is rough to the touch.

Component (II) is a matting agent, which is typically selected from silica, silicone powder, acrylic powder, and urethane powder. Of these, silica is preferred as the matting agent because it is readily dispersible in water and inexpensive. Silica should preferably have a pore volume of 0.2 ml/g to 2 ml/g, more preferably 0.6 ml/g to 2 ml/g. With a pore volume of less than 0.2 ml/g, the luster of leather may not disappear even after treatment with the coating composition. With a pore volume of more than 2 ml/g, a coating may lose abrasion resistance.

The average particle size of silica is not particularly limited as long as the pore volume is in the range of 0.2 ml/g to 2 ml/g. Preferably the average particle size of silica is 1 µm to 10 µm, more preferably 1 µm to 8 µm. When the average particle size is not less than 1 µm, silica particles serve to deprive luster from the leather surface without being buried in the leather. When the average particle size is not more than 10 µm, silica particles exert their function without spalling off the leather surface. It is noted that the average particle size may be determined by particle size distribution measurement by the laser diffraction method.

Silica is commercially available, for example, under the trade name of Sylobloc, Syloid, and Sylojet from Grace & Co., Sylysia from Fuji Silysia Chemical Ltd., Carplex from DSL Japan, and Sunsphere from AGC Si-Tech Co., Ltd. An appropriate amount of the matting agent used is 10 to 40% by weight, preferably 10 to 30% by weight based on the coating composition, both calculated as solid contents. If the amount of the matting agent is less than 10 wt %, little or no matting effect may be observed. If the amount of the matting agent exceeds 40 wt %, the coating may become whitened and lose abrasion resistance.

Component (III) is a silicone-acrylic graft copolymer resin emulsion which is obtained by reacting (i) a polyorganosiloxane having a molecular weight of at least 300,000 and represented by the general formula (1) with (ii) an acrylate or methacrylate monomer. Preferably it is obtained from emulsion graft polymerization of a mixture of (i) the polyorganosiloxane having formula (1), (ii) the acrylate or methacrylate monomer, and (iii) a functionalized monomer copolymerizable therewith. More preferably, the silicone-acrylic graft copolymer resin emulsion (III) is obtained using 100 parts by weight of polyorganosiloxane (i), 10 to 100 parts by weight of monomer (ii), and 0.01 to 20 parts by weight of monomer (iii), even more preferably 40 to 100 parts by weight of monomer (ii) and 0.01 to 5 parts by weight of monomer (iii).

The polyorganosiloxane (i) has the general formula (1).

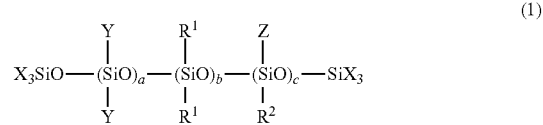

Herein $R^1$ is each independently a substituted or unsubstituted monovalent hydrocarbon group of 1 to 20 carbon atoms, $R^2$ is a mercapto, acryloxy or methacryloxy-substituted $C_1$-$C_6$ alkyl group, or vinyl group, X is each independently a substituted or unsubstituted monovalent hydrocarbon group of 1 to 20 carbon atoms, $C_1$-$C_{20}$ alkoxy group, or hydroxyl group, Y is each independently X or —[O—Si$(X)_2]_d$—X, at least two of X and Y being hydroxyl groups, Z is a $C_1$-$C_4$ alkyl group, $C_1$-$C_4$ alkoxy group or hydroxyl group, a is a number of 0 to 1,000, b is a positive number of 100 to 10,000, c is a positive number of 1 to 10, and d is a positive number of 1 to 1,000.

Specifically, $R^1$ is identical or different, and a substituted or unsubstituted monovalent hydrocarbon group having 1 to 20 carbon atoms. Examples include an alkyl group such as methyl, ethyl, propyl, butyl, pentyl, hexyl, heptyl, octyl, nonyl, decyl, dodecyl, tetradecyl, hexadecyl and octadecyl; a cycloalkyl group such as cyclopentyl, cyclohexyl and cycloheptyl; an alkenyl group such as vinyl and allyl; an aryl group such as phenyl, tolyl and naphthyl; an alkenylaryl group such as vinylphenyl, an aralkyl group such as benzyl, phenylethyl and phenylpropyl; an alkenylaralkyl group such as vinylbenzyl and vinylphenylpropyl; and a substituted one in which a part or all hydrogen atoms of the above groups are substituted with a halogen atom such as fluorine, bromine and chlorine, acryloxy group, methacryloxy group, carboxyl group, alkoxy group, alkenyloxy group, amino group, and alkyl-, alkoxy- or (meth)acryloxy-substituted amino group.

Among them, methyl group is preferred as $R^1$.

$R^2$ is a mercapto, acryloxy or methacryloxy-substituted $C_1$-$C_6$ alkyl group, or vinyl group. Inter alia, mercaptopropyl, acryloxypropyl, methacryloxypropyl and vinyl are preferred.

X is identical or different, and a substituted or unsubstituted monovalent hydrocarbon group having 1 to 20 carbon atoms, an alkoxy group having 1 to 20 carbon atoms, or hydroxyl group. Examples of the substituted or unsubstituted monovalent hydrocarbon group of 1 to 20 carbon atoms include those exemplified in $R^1$. Examples of the alkoxy group of 1 to 20 carbon atoms include methoxy, ethoxy, propoxy, butoxy, hexyloxy, heptyloxy, octyloxy, decyloxy and tetradecyloxy. Preferably, X is hydroxyl group, methyl group, butyl group, and phenyl group.

Y is X or $-[O-Si(X)_2]_d-X$.

Z is a $C_1$-$C_4$ alkyl group, $C_1$-$C_4$ alkoxy group or hydroxyl group, preferably hydroxyl or methyl.

The subscript "a" is a number of 0 to 1,000, preferably 0 to 200, because the strength of a coating becomes insufficient when "a" exceeds 1,000. The subscript "b" is a positive number of 100 to 10,000, preferably 1,000 to 5,000, because a coating becomes less flexible when b is less than 100 and a coating loses tear strength when b exceeds 10,000. The subscript "c" is a positive number of 1 to 10, because a coating fails to improve abrasion resistance when c exceeds 10. The subscript "d" is a positive number of 1 to 1,000, preferably 1 to 200.

From the crosslinking aspect, the polyorganosiloxane should contain at least 2 hydroxyl groups, preferably 2 to 4 hydroxyl groups per molecule, more preferably at both ends. This means that at least two of X and Y are hydroxyl groups.

The polyorganosiloxane (i) is preferably used in emulsion form while it may be either selected from commercial products or synthesized. Synthesis may be conducted by any well-known emulsion polymerization methods. For example, the polyorganosiloxane (i) may be readily synthesized by emulsifying and dispersing a cyclic organosiloxane which may have a fluorine atom, (meth)acryloxy, carboxyl, hydroxyl, or amino group, or an α,ω-dihydroxysiloxane oligomer, α,ω-dialkoxysiloxane oligomer or alkoxysilane, and a silane coupling agent in water with the aid of an anionic surfactant, optionally adding a catalyst such as acid, and effecting polymerization reaction. The silane coupling agent used herein has the general formula (2).

(2)

Herein $R^3$ is a monovalent organic group having a polymerizable double bond, especially an acryloxy or methacryloxy-substituted $C_1$-$C_6$ alkyl, $R^4$ is $C_1$-$C_4$ alkyl, $R^5$ is $C_1$-$C_4$ alkyl, e is an integer of 2 or 3, f is an integer of 0 or 1, and e+f is equal to 2 or 3.

Examples of the cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethyloycyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane,
1,3,5,7-tetra(3-acryloxypropyl)tetramethylcyclotetrasiloxane,
1,3,5,7-tetra(3-carboxypropyl)tetramethylcyclotetrasiloxane,
1,3,5,7-tetra(3-vinyloxypropyl)tetramethylcyclotetrasiloxane,
1,3,5,7-tetra(p-vinylphenyl)tetramethylcyclotetrasiloxane,
1,3,5,7-tetra[3-(p-vinylphenyl)propyl]tetramethylcyclotetrasiloxane,
1,3,5,7-tetra(N-acryloyl-N-methyl-3-aminopropyl)tetramethylcyclotetrasiloxane, and
1,3,5,7-tetra(N,N-bis(lauroyl)-3-aminopropyl)tetramethylcyclotetrasiloxane.

Inter alia, octamethylcyclotetrasiloxane and decamethylcyclopentasiloxane are preferred.

Suitable silane coupling agents include vinylsilanes such as vinyltrimethoxysilane, vinyltriethoxysilane, vinyltripropoxysilane, vinyltriisopropoxysilane, vinylmethyldimethoxysilane, and vinylmethyldiethoxysilane; acrylsilanes such as γ-(meth)acryloxypropyltrimethoxysilane, γ-(meth)acryloxypropyltriethoxysilane, γ-(meth)acryloxypropyltripropoxysilane, γ-(meth)acryloxypropyltriisopropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane, and γ-(meth)acryloxypropylmethyldibutoxysilane; and mercaptosilanes such as γ-mercaptopropylmethyldimethoxysilane and γ-mercaptopropyltrimethoxysilane. In some cases, oligomers obtained from polycondensation of the foregoing are preferred because the generation of alcohol is suppressed. The silane coupling agent is preferably used in an amount of 0.01 to 20 parts, more preferably 0.01 to 5 parts by weight per 100 parts by weight of the cyclic organosiloxane.

Copolymerization of the silane coupling agent forms a polyorganosiloxane containing units (c) in formula (1), exerting the effect of grafting monomer (ii) or (iii).

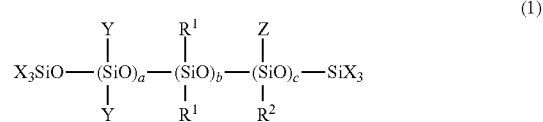

(1)

The catalyst used for polymerization may be any of well-known polymerization catalysts. Among others, strong acids are preferred, for example, hydrochloric acid, sulfuric acid, dodecylbenzenesulfonic acid, citric acid, lactic acid, and ascorbic acid. Most preferred is dodecylbenzenesulfonic acid having emulsifying ability. The catalyst is preferably used in an amount of 0.01 to 10 parts, more preferably 0.2 to 2 parts by weight per 100 parts by weight of the cyclic organosiloxane.

Suitable surfactants used for polymerization are anionic surfactants including sodium lauryl sulfate, sodium laureth sulfate, N-acyl amino acid salts, N-acyl taurate salts, aliphatic soaps, and alkyl phosphate salts. Those surfactants which are soluble in water and free of polyethylene oxide chain are preferred. Inter alia, N-acyl amino acid salts, N-acyl taurate salts, aliphatic soaps, and alkyl phosphate salts are more preferred. Sodium methyl lauroyl taurate, sodium methyl myristoyl taurate and sodium lauryl sulfate are most preferred. The anionic surfactant is preferably used in an amount of 0.1 to 20 parts, more preferably 0.5 to 10 parts by weight per 100 parts by weight of the cyclic organosiloxane.

Polymerization is preferably conducted at a temperature of 50 to 75° C. for a time of at least 10 hours, more preferably at least 15 hours. Polymerization is preferably followed by aging at 5 to 30° C. for at least 10 hours.

In this way, there is obtained the organopolysiloxane (i) which has a molecular weight of at least 300,000, preferably 400,000 to 1,000,000. An organopolysiloxane having a molecular weight of less than 300,000 is less effective for improving abrasion resistance when leather is coated therewith.

It is noted that the molecular weight M of an organopolysiloxane may be calculated from a specific viscosity $\eta sp$ (25° C.) of a toluene solution of the organopolysiloxane in a concentration of 1 g/100 ml according to the following equations wherein $\eta_0$ is a viscosity of toluene, and $\eta$ is a viscosity of the solution.

$$\eta sp = [\eta] + 0.3[\eta]^2$$

$$\eta sp = [\eta] + 0.3[\eta]^2$$

$$[\eta] = 2.15 \times 10^{-4} M^{0.65}$$

More specifically, 20 g of an organopolysiloxane emulsion is mixed with 20 g of isopropyl alcohol (IPA) to break the emulsion. After IPA is discarded, there is left a rubber-like organopolysiloxane, which is dried overnight at 60° C. This organopolysiloxane is dissolved in toluene in a concentration of 1 g/100 ml. The viscosity of the toluene solution is measured at 25° C. by a Ubbelohde viscometer. By substituting the viscosity in the equations, the molecular weight M is computed. See Nakamuta, Journal of Japan Chemical Society, 77, 858 (1956).

The acrylic or methacrylic acid ester (ii) refers to an acrylate or methacrylate monomer free of a functional group such as hydroxyl, amide or carboxyl. Acrylate and methacrylate monomers having a $C_1$-$C_{10}$ alkyl moiety are preferred, and acrylate and methacrylate monomers whose homopolymer has a glass transition temperature (Tg) of at least 40° C., especially at least 60° C. are more preferred. Such preferred monomers include methyl methacrylate, isopropyl methacrylate, ethyl methacrylate, and cyclohexyl methacrylate. The upper limit of Tg is preferably up to 200° C., more preferably up to 150° C. Notably, Tg is measured according to JIS K-7121.

The functionalized monomer (iii) copolymerizable with monomer (ii) is an unsaturated bond-bearing monomer having a carboxyl, amide, hydroxyl, vinyl or allyl group. Suitable monomers include methacrylic acid, acrylic acid, acrylamide, allyl methacrylate, vinyl methacrylate, 2-hydroxyethyl methacrylate, and 2-hydroxypropyl methacrylate. By copolymerizing such a monomer, the polymer becomes more compatible.

The silicone-acrylic graft copolymer resin emulsion (III) is obtained from emulsion graft polymerization of a mixture of the polyorganosiloxane (1), the (meth)acrylate monomer (ii), and the functionalized monomer (iii).

On graft polymerization, the polyorganosiloxane having formula (1) and the (meth)acrylate monomer are combined in a weight ratio of from 80:20 to 99:1, preferably from 85:15 to 99:1. If the silicone component is less than 80, a coating on leather fails to improve abrasion resistance.

Examples of the radical initiator used herein include persulfates such as potassium persulfate and ammonium persulfate, aqueous hydrogen persulfate, t-butyl hydroperoxide, and hydrogen peroxide. If desired, the initiator may be combined with a reducing agent to form a redox system, with suitable reducing agents including acidic sodium sulfite, Rongalite, L-ascorbic acid, tartaric acid, saccharides, and amines.

Although the surfactant already contained in the polyorganosiloxane emulsion is sufficient for graft polymerization to take place, an anionic surfactant may be added to the system to enhance stability. Suitable anionic surfactants include sodium lauryl sulfate, sodium laureth sulfate, N-acyl amino acid salts, N-acyl taurate salts, aliphatic soaps, and alkyl phosphate salts. Alternatively, a nonionic emulsifier may be added, for example, polyoxyethylene lauryl ether and polyoxyethylene tridecyl ether.

Graft polymerization of components (ii) and (iii) to component (i) is preferably conducted at a temperature of 25 to 55° C., more preferably 25 to 40° C. and for a time of 2 to 8 hours, more preferably 3 to 6 hours.

A chain transfer agent may be added to the polymerization system for adjusting the molecular weight and grafting degree of a graft polymer.

The silicone-acrylic graft copolymer resin emulsion (III) thus obtained contains a copolymer based on component (i) to which components (ii) and (iii) are randomly grafted.

Preferably the silicone-acrylic graft copolymer resin emulsion (III) has a solid content of 35 to 50% by weight. Also preferably it has a viscosity at 25° C. of up to 500 mPa·s, more preferably 50 to 500 mPa·s, as measured by a rotational viscometer. Further preferably it has an average particle size of 0.1 to 0.5 μm (i.e., 100 to 500 nm), as measured by a laser diffraction/scattering type particle size distribution analyzer.

An appropriate amount of the silicone-acrylic graft copolymer resin emulsion (III) used is 1 to 30%, more preferably 5 to 30%, and even more preferably 10 to 30% by weight of the leather coating composition, both calculated as solid contents. Less than 1 wt % of the resin emulsion (III) fails to achieve an improvement in abrasion resistance whereas more than 30 wt % of the resin emulsion (III) causes whitening and a drop of abrasion resistance.

The leather coating composition may be prepared by any well-known mixing methods, for example, by mixing the aqueous urethane resin (I), the matting agent (II) and the silicone-acrylic graft copolymer resin emulsion (III) in water on a propeller mixer or homogenizer. Preferably the matting agent (II) is previously dispersed in water using any well-known mixer such as Disper.

To the leather coating composition, other components may be added as long as its properties are not compromised. Suitable other components include antioxidants, coloring agents, UV absorbers, photo-stabilizers, antistatic agents, plasticizers, flame retardants, thickeners, surfactants, organic solvents serving as auxiliary film former, and other resins.

On use, the leather coating composition is applied onto natural, artificial or synthetic leather to form a coating thereon. The artificial and synthetic leathers may be made of urethane resins, vinyl chloride resins or the like although urethane-base artificial and synthetic leathers are preferred.

For example, the leather products of the present invention can be used for the material of bag; clothes such as coat, pants, riding wear, flight jacket, motorcycle clothing, various types of working clothe, and the like; miscellaneous goods such as belt, suspender, shoes, glove, ball for ball sport, wallet, datebook, and the like; furniture, car interior material, seat and grip for motorcycle, saddle for bicycle, carpet; musical instruments such as drum, shamisen (Japanese musical instrument) and the like; and filling material.

The means of applying the leather coating composition to form a coating is not particularly limited. Any coating methods using a gravure coater, bar coater, blade coater, roll coater, air knife coater, screen coater, curtain coater, and brush may be used. Spraying, dipping and other coating techniques are also acceptable.

The coating weight of the leather coating composition is not particularly limited. It is preferred from the standpoints of anti-staining and coating efficiency that a coating is formed by applying the coating composition in a coating weight of 1 to 300 g/m$^2$, more preferably 5 to 100 g/m$^2$, calculated as solids, and air drying or heat drying at 100 to 200° C.

EXAMPLE

Examples are given below by way of illustration and not by way of limitation. In Examples, all parts and % are by weight. The molecular weight of an organopolysiloxane is calculated from a specific viscosity of a toluene solution of the organopolysiloxane in a concentration of 1 g/100 ml.

Preparation Example 1

A 2-L polyethylene beaker was charged with a solution of 499.6 g of octamethylcyclotetrasiloxane, 0.58 g of γ-methacryloxypropylmethyldiethoxysilane, and 5 g of sodium lauryl sulfate in 45 g of deionized water and a solution of 5 g of dodecylbenzenesulfonic acid in 45 g of deionized water. The mixture was uniformly emulsified by a homomixer, diluted by slowly adding 400 g of deionized water, and passed 2 times through a high-pressure homogenizer under a pressure of 300 kgf/cm$^2$ until a uniform white emulsion was obtained. The emulsion was transferred to a 2-L glass flask equipped with a stirrer, thermometer and reflux condenser where polymerization reaction took place at 55° C. for 24 hours. The emulsion was aged at 10° C. for 24 hours and neutralized to pH 6.2 with 12 g of 10% sodium carbonate aqueous solution. The emulsion had a nonvolatile content (or solid content) of 45.4% on 105° C./3 hour drying, and the organopolysiloxane in the emulsion was a non-flowing soft gel. This silicone had a molecular weight of about 400,000 as calculated from the viscosity of toluene solution and a structure represented by formula (1). To the emulsion, 55.5 g of methyl methacrylate (MMA) was added dropwise over 3 to 5 hours, during which redox reaction was conducted by a peroxide and a reducing agent, thereby effecting acrylic graft copolymerization to silicone. There was obtained a silicone-acrylic graft copolymer resin emulsion having a nonvolatile content of 44.5%.

Preparation Example 2

A silicone-acrylic graft copolymer resin emulsion having a nonvolatile content of 43.5% was obtained by the same procedure as in Preparation Example 1 aside from using butyl acrylate (BA) instead of MMA.

Preparation Example 3

A silicone-acrylic graft copolymer resin emulsion having a nonvolatile content of 44.4% was obtained by the same procedure as in Preparation Example 1 aside from changing the amount of γ-methacryloxypropylmethyldiethoxysilane to 0.29 g, and using 119 g of BA and 6 g of 2-hydroxyethyl methacrylate (2-HEMA) instead of 55.5 g of MMA.

Preparation Example 4

A silicone-acrylic graft copolymer resin emulsion having a nonvolatile content of 44.2% was obtained by the same procedure as in Preparation Example 1 aside from changing the amount of MMA to 125 g.

Preparation Example 5

A silicone-acrylic graft copolymer resin emulsion having a nonvolatile content of 44.8% was obtained by the same procedure as in Preparation Example 1 aside from using 26.1 g of BA instead of 55.5 g of MMA.

Preparation Example 6

A 2-L polyethylene beaker was charged with a solution of 499.6 g of octamethylcyclotetrasiloxane, 0.60 g of γ-methacryloxypropylmethyldiethoxysilane, and 5 g of sodium lauryl sulfate in 45 g of deionized water and a solution of 5 g of dodecylbenzenesulfonic acid in 45 g of deionized water. The mixture was uniformly emulsified by a homomixer, diluted by slowly adding 400 g of deionized water, and passed 2 times through a high-pressure homogenizer under a pressure of 300 kgf/cm$^2$ until a uniform white emulsion was obtained. The emulsion was transferred to a 2-L glass flask equipped with a stirrer, thermometer and reflux condenser where polymerization reaction took place at 55° C. for 24 hours. The emulsion was aged at 0° C. for 24 hours and neutralized to pH 6.2 with 12 g of 10% sodium carbonate aqueous solution. The emulsion had a nonvolatile content (or solid content) of 45% on 105° C./3 hour drying, and the organopolysiloxane in the emulsion was a non-flowing soft gel. This silicone had a molecular weight of about 650,000 as calculated from the viscosity of toluene solution and a structure represented by formula (1). To the emulsion, 26.1 g of methyl methacrylate (MMA) was added dropwise over 3 to 5 hours, during which redox reaction was conducted by a peroxide and a reducing agent, thereby effecting acrylic graft copolymerization to silicone. There was obtained a silicone-acrylic graft copolymer resin emulsion having a nonvolatile content of 44.8%.

Comparative Preparation Example 1

A 2-L polyethylene beaker was charged with a solution of 499.6 g of octamethylcyclotetrasiloxane, 1.30 g of γ-methacryloxypropylmethyldiethoxysilane, and 5 g of sodium lauryl sulfate in 45 g of deionized water and a solution of 5 g of dodecylbenzenesulfonic acid in 45 g of deionized water. The mixture was uniformly emulsified by a homomixer, diluted by slowly adding 400 g of deionized water, and passed 2 times through a high-pressure homogenizer under a pressure of 300 kgf/cm² until a uniform white emulsion was obtained. The emulsion was transferred to a 2-L glass flask equipped with a stirrer, thermometer and reflux condenser where polymerization reaction took place at 70° C. for 24 hours. The emulsion was then neutralized to pH 6.2 with 12 g of 10% sodium carbonate aqueous solution. The emulsion had a nonvolatile content (or solid content) of 45% on 105° C./3 hour drying, and the organopolysiloxane in the emulsion was a non-flowing soft gel. This silicone had a molecular weight of about 100,000 as calculated from the viscosity of toluene solution and a structure represented by formula (1). To the emulsion, 55.5 g of methyl methacrylate (MMA) was added dropwise over 3 to 5 hours, during which redox reaction was conducted by a peroxide and a reducing agent, thereby effecting acrylic graft copolymerization to silicone. There was obtained a silicone-acrylic graft copolymer resin emulsion having a nonvolatile content of 44.8%.

Comparative Preparation Example 2

An emulsion was prepared by the same procedure as in Preparation Example 1 except that γ-methacryloxypropylmethyldiethoxysilane was used in an amount of 0.29 g and MMA was used in an amount of 215 g instead of 55.5 g, thereby obtaining a silicone-acrylic graft copolymer resin emulsion having a nonvolatile content of 44.7%.

Comparative Preparation Example 3

A 2-L polyethylene beaker was charged with a solution of 499.6 g of octamethylcyclotetrasiloxane, 13.0 g of γ-methacryloxypropylmethyldiethoxysilane, and 5 g of sodium lauryl sulfate in 45 g of deionized water and a solution of 5 g of dodecylbenzenesulfonic acid in 45 g of deionized water. The mixture was uniformly emulsified by a homomixer, diluted by slowly adding 400 g of deionized water, and passed 2 times through a high-pressure homogenizer under a pressure of 300 kgf/cm² until a uniform white emulsion was obtained. The emulsion was transferred to a 2-L glass flask equipped with a stirrer, thermometer and reflux condenser where polymerization reaction took place at 55° C. for 24 hours. The emulsion was aged at 20° C. for 24 hours and neutralized to pH 6.2 with 12 g of 10% sodium carbonate aqueous solution. The emulsion had a nonvolatile content (or solid content) of 45% on 105° C./3 hour drying, and the organopolysiloxane in the emulsion was a non-flowing soft gel. This silicone had a molecular weight of about 250,000 as calculated from the viscosity of toluene solution and a structure represented by formula (1). To the emulsion, 55.5 g of methyl methacrylate (MMA) was added dropwise over 3 to 5 hours, during which redox reaction was conducted by a peroxide and a reducing agent. However, in the stage of adding MMA dropwise, the emulsion became unstable and a gel formed.

The emulsions of Preparation Examples 1 to 6 and Comparative Preparation Examples 1 to 3 were evaluated by the following tests. The results are also shown in Table 1.

Graft Point

The graft point is depicted at "c" in formula (1) and calculated according to the following equations.

$$X_3SiO-(SiO)_a-(SiO)_b-(SiO)_c-SiX_3 \atop {\phantom{X_3SiO-}|\phantom{(SiO)_a-}|\phantom{(SiO)_b-}|\phantom{(SiO)_c-} \atop Y\phantom{SiO-(SiO)_a-}R^1\phantom{(SiO)_b-}R^2}} \quad (1)$$

with Y, R¹, Z on top and Y, R¹, R² on bottom.

A=(weight of silane coupling agent)/(molecular weight of silane coupling agent)
B=(weight of siloxane)/(calculated molecular weight of organopolysiloxane)
A/B=the number of graft points For the silicone-acrylic graft copolymer resin emulsion in Preparation Example 1, for example, calculation is:

$A=0.58/232.35=0.0025$ mol, $B=(499.6+0.58)/400,000=0.00125$ mol, then A/B=2, indicating that the number of graft points is 2.

The number of graft points may be adjusted by changing the amount of silane coupling agent.

Solid Content Measurement

A sample, about 1 g, was precisely weighed in an aluminum foil dish (70 mm diameter, 12 mm high), which was placed in a dryer kept at about 105° C., heated for 1 hour, taken out of the dryer, and placed in a desiccator where the sample was allowed to cool. The weight of the sample after drying was measured. An evaporation residue R (%) was calculated according to the following equation:

$R=(T-L)/(W-L)\times 100$ wherein W is the weight (g) of aluminum foil dish containing sample prior to drying, L is the weight (g) of aluminum foil dish, and T is the weight (g) of aluminum foil dish containing dry sample.

Viscosity Measurement

While a sample was kept at a temperature of 23±0.5° C., a viscosity was measured by a BM type viscometer with #1 rotor at 6 rpm.

Measurement of Average Particle Size of Emulsion

Using a laser diffraction/scattering type particle size distribution analyzer LA950V2 (Horiba, Ltd.), the particle size of the emulsion was measured.

Appearance of Emulsion

The emulsion was stored at 40° C. for 1 month before its outer appearance was evaluated.
○: intact
Δ: sedimented and separated
×: gelled

TABLE 1

| Components | Preparation Example | | | | | | Comparative Preparation Example | | |
|---|---|---|---|---|---|---|---|---|---|
| (pbw) | 1 | 2 | 3 | 4 | 5 | 6 | 1 | 2 | 3 |
| Siloxane (100,000) | | | | | | | | 90 | |
| Siloxane (250,000) | | | | | | | | | 90 |

TABLE 1-continued

| Components | Preparation Example | | | | | | Comparative Preparation Example | | |
|---|---|---|---|---|---|---|---|---|---|
| (pbw) | 1 | 2 | 3 | 4 | 5 | 6 | 1 | 2 | 3 |
| Siloxane (400,000) | 90 | 90 | 80 | 80 | 95 | | | 70 | |
| Siloxane (650,000) | | | | | | 95 | | | |
| MMA | 10 | | | 20 | | 5 | 10 | 30 | 10 |
| BA | | 10 | 19 | | 5 | | | | |
| 2-HEMA | | | 1 | | | | | | |
| Graft point | 2 | 2 | 1 | 2 | 2 | 3 | 1 | 1 | 25 |
| Solid content (%) | 44.5 | 43.5 | 44.4 | 44.2 | 44.8 | 44.8 | 44.8 | 44.7 | polymerization X |
| Viscosity (mPa · s) | 40 | 50 | 50 | 50 | 50 | 50 | 60 | 60 | — |
| Particle size of emulsion (nm) | 300 | 300 | 300 | 300 | 300 | 300 | 300 | 300 | — |
| Appearance of emulsion @40° C./1 month | ○ | ○ | ○ | ○ | ○ | ○ | ○ | ○ | — |

* The value in parentheses of siloxane is a molecular weight calculated from the specific viscosity of toluene solution (1 g sample in 100 ml toluene).

In the following Examples and Comparative Examples, coating compositions were prepared and evaluated for applicability and performance.

Example 1

A coating composition was prepared by mixing a water dispersion of silica matting agent (Sylysia 550), aqueous polycarbonate type urethane resin (Hydran WLS-213), and the silicone-acrylic graft copolymer resin emulsion of Preparation Example 1 in the amounts (solid basis) shown in Table 2. The composition was coated on urethane-based artificial leather (DIC Corp.) in a coating weight of 25 g/m² using a bar coater #16 and dried at 150° C. for 1 minute.

The weight average molecular weight (Mw) of urethane resin was measured as follows. 50 mg of a urethane resin was dissolved in 5 ml of tetrahydrofuran. The resulting solution was filtered with a membrane filter to prepare a test sample. Retention time and intensity of the test sample were measured by using a gel permeation chromatograph equipped with a differential refractive index detector. A calibration curve was drawn up from polystyrenes having various known molecular weights (GL Sciences Inc.) and the weight average molecular weight of the urethane resin was obtained by automatic calculation.

The coated leather was evaluated by the following tests, with the results shown in Table 2.

Abrasion Resistance

A piece of ~3 cm×~25 cm was cut from the coated leather and mounted on a standard abrasion tester. The leather piece was rubbed with cotton fabric under a load of 50 g. The rubbing cycle consisting of back and forth strokes was counted until the surface changed. A greater rubbing cycle indicates better abrasion resistance.

Coffee Staining

A drop of commercially available coffee was deposited on the coated leather, which was allowed to dry. The leather was wiped with wet tissue.
○: fully removed
Δ: partly removed with stain left
×: not removed Gloss Using a handy gloss meter PG-1M (Nippon Denshoku Industries Co., Ltd.), a gloss value at 60° on the coating side was measured. Provided that an angle of view to the leather from the upright position was 0° and an angle of view to the leather from the horizontal position was 90°, light was directed to the leather at an angle of 60° and the light reflected thereby was measured as a gloss value. A gloss value of 5 or less is acceptable, with lower values being more desirable.

Whitening

The coated leather was evaluated by visual observation.
○: not whitened
Δ: furrows are whitened
×: overall whitened Examples 2 to 10 & Comparative Examples 1 to 5

As in Example 1, coating compositions were prepared according to the formulation in Table 2 and evaluated by the same tests. The results are shown in Table 2.

TABLE 2

| Components | Example | | | | | | | | | | Comparative Example | | | | |
|---|---|---|---|---|---|---|---|---|---|---|---|---|---|---|---|
| (pbw) | 1 | 2 | 3 | 4 | 5 | 6 | 7 | 8 | 9 | 10 | 1 | 2 | 3 | 4 | 5 |
| Hydran WLS-213 | 70 | | 70 | 70 | 70 | 70 | | 55 | 70 | 70 | 60 | 60 | 40 | 80 | 40 |
| Permarin UA-368 | | 70 | | | | | | | | | | | | | |
| Superflex 460 | | | | | | | 60 | | | | | | | | |
| Sylysia 550 | 20 | 20 | 20 | 20 | 20 | 20 | 30 | 15 | | | 30 | 30 | 20 | 20 | 50 |
| Sylobloc S200 | | | | | | | | | 20 | 20 | | | | | |
| Preparation Example 1 | 10 | 10 | | | | | 10 | 30 | 10 | | | | 40 | | 10 |
| Preparation Example 2 | | | 10 | | | | | | | | | | | | |

TABLE 2-continued

| Components (pbw) | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 |
|---|---|---|---|---|---|---|---|---|---|---|---|---|---|---|---|
| Preparation Example 3 | | | | 10 | | | | | | | | | | | |
| Preparation Example 4 | | | | | 10 | | | | | | | | | | |
| Preparation Example 5 | | | | | | 10 | | | | | | | | | |
| Preparation Example 6 | | | | | | | | | | 10 | | | | | |
| Comparative Preparation Example 1 | | | | | | | | | | | | | 10 | | |
| Comparative Preparation Example 2 | | | | | | | | | | | | | | 10 | |
| Test results | | | | | | | | | | | | | | | |
| Abrasion resistance (cycles) | 5,000 | 4,200 | 3,800 | 5,200 | 4,400 | 4,600 | 4,400 | 3,900 | 3,500 | 6,800 | 600 | 400 | 500 | 500 | 400 |
| Coffee staining | ○ | ○ | ○ | ○ | ○ | ○ | ○ | ○ | ○ | ○ | Δ | Δ | Δ | X | X |
| Gloss | 1.2 | 1.5 | 1.5 | 2.1 | 1.5 | 1.3 | 1.8 | 1.9 | 2.1 | 1.3 | 7.5 | 5.5 | 12.6 | 4.5 | 1.5 |
| Whitening | ○ | ○ | ○ | ○ | ○ | ○ | ○ | ○ | ○ | ○ | Δ | X | Δ | Δ | X |

Hydran WLS-213: aqueous polycarbonate type urethane resin by DIC Corp. (weight average molecular weight: ca. 190,000)
Permarin UA-368: aqueous polycarbonate type urethane resin by Sanyo Chemical Industries, Ltd. (weight average molecular weight: ca. 100,000)
Superflex 460: aqueous polycarbonate type urethane resin by DKS Ltd. (weight average molecular weight: ca. 40,000)
Sylysia 550: silica (average particle size 4 μm, pore volume 0.8 ml/g) by Fuji Silysia Co., Ltd.
Sylobloc S200: silica (average particle size 3 μm, pore volume 0.6 ml/g) by Grace & Co.

It is noted that the average particle size and pore volume of matting agent (II) are measured by the methods of JIS K-1150 (laser diffraction type particle size distribution measurement and nitrogen adsorption isotherm).

As is evident from the data in Table 2, the leather coating compositions within the scope of the invention are aqueous, advantageous in terms of coating environment and environmental load, and effective for imparting abrasion resistance and anti-staining properties to leather.

Japanese Patent Application No. 2014-258179 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A leather coating composition comprising, all calculated as solid contents, (I) 50 to 80% by weight of an aqueous urethane resin having a weight average molecular weight of 40,000 to 400,000, (II) 10 to 40% by weight of a matting agent consisting of silica, and (III) 1 to 30% by weight of a silicone-acrylic graft copolymer resin emulsion obtained by reacting a polyorganosiloxane with an acrylate or methacrylate monomer in a weight ratio of 80:20 to 99:1, said polyorganosiloxane having a molecular weight of at least 300,000 and being represented by the general formula (1):

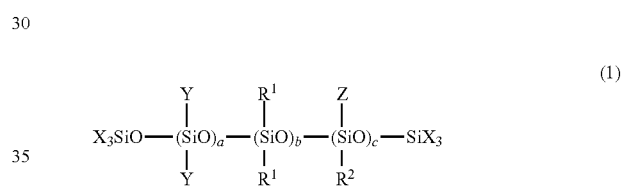

wherein
R$^1$ is each independently a substituted or unsubstituted monovalent hydrocarbon group of 1 to 20 carbon atoms,
R$^2$ is a mercapto, acryloxy or methacryloxy-substituted C$_1$-C$_6$ alkyl group, or vinyl group,
X is each independently a substituted or unsubstituted monovalent hydrocarbon group of 1 to 20 carbon atoms, C$_1$-C$_{20}$ alkoxy group, or hydroxyl group,
Y is each independently X or —[O—Si(X)$_2$]$_d$—X, wherein d is a positive number of 1 to 1,000,
at least two of X and Y being hydroxyl groups,
Z is a C$_1$-C$_4$ alkyl group, C$_1$-C$_4$ alkoxy group or hydroxyl group,
a is a number of 0 to 1,000,
b is a positive number of 100 to 10,000, and
c is a positive number of 1 to 10.

2. The coating composition of claim 1 wherein the monovalent hydrocarbon group of R$^1$ and X each is a straight, branched or cyclic C$_1$-C$_{20}$ alkyl group or C$_6$-C$_{20}$ aryl group.

3. The coating composition of claim 1 or 2 wherein the silicone-acrylic graft copolymer resin emulsion (III) is an emulsion graft copolymer of (i) the polyorganosiloxane having formula (1), (ii) the acrylate or methacrylate monomer, and (iii) a functionalized monomer copolymerizable therewith.

4. The coating composition of claim 3, wherein said functionalized monomer (iii) is methacrylic acid, acrylic acid, acrylamide, allyl methacrylate, vinyl methacrylate, 2-hydroxyethyl methacrylate, or 2-hydroxypropyl methacrylate.

5. The coating composition of claim 1 wherein the aqueous urethane resin (I) is a polycarbonate type urethane resin.

6. The coating composition of claim 1 wherein the silicone-acrylic graft copolymer resin emulsion (III) has a solid content of 1 to 30% by weight and a viscosity of up to 500 mPa·s at 25° C.

7. The coating composition of claim 1, wherein the silica has a pore volume of 0.6 ml/g to 2 ml/g and an average particle size of 1 μm to 8 μm.

8. A leather coated with the coating composition of claim 1.

9. The coated leather of claim 8, wherein said leather is a synthetic leather made of urethane resin or vinyl chloride resin or is a natural leather.

10. The coated leather of claim 8, wherein the coating is formed by applying the coating composition of claim 1 onto the leather at a coating weight of 5 to 100 g/m$^2$.

* * * * *